United States Patent [19]

Noguchi et al.

[11] 4,256,827

[45] Mar. 17, 1981

[54] PHOTOGRAPHIC ELEMENT FOR COLOR DIFFUSION TRANSFER PROCESS HAVING A NOVEL NEUTRALIZING SYSTEM

[75] Inventors: Yasuhiro Noguchi; Shinji Sakaguchi; Takashi Yoshida, all of Minami-ashigara, Japan

[73] Assignee: Fuji Photo Film Co., Ltd., Minami-ashigara, Japan

[21] Appl. No.: 31,680

[22] Filed: Apr. 19, 1979

[30] Foreign Application Priority Data

Apr. 19, 1978 [JP] Japan ................................ 53-46246

[51] Int. Cl.[3] ........................ G03C 1/48; G03C 1/40; B32B 27/08; B32B 27/30

[52] U.S. Cl. .................................. 430/215; 428/500; 428/515; 428/522; 430/227; 430/463; 430/644

[58] Field of Search ............ 96/296, 77, 76 R, 119 R; 428/522, 515, 500; 430/215, 463, 227, 644

[56] References Cited

U.S. PATENT DOCUMENTS

| | | | |
|---|---|---|---|
| 3,421,893 | 1/1969 | Taylor | 96/77 |
| 3,785,815 | 1/1974 | Autges et al. | 96/77 |
| 4,056,394 | 11/1977 | Hannie | 96/77 |

*Primary Examiner*—Richard L. Schilling
*Attorney, Agent, or Firm*—Sughrue, Rothwell, Mion, Zinn and Macpeak

[57] ABSTRACT

In a photographic element for the color diffusion transfer process including a neutralizing system for reducing the pH of an aqueous alkaline developing solution which comprises a neutralizing layer and a timing layer, wherein the timing layer is positioned on or under the neutralizing layer in direct or indirect contact therewith such that the aqueous alkaline developing solution reaches the neutralizing layer through the timing layer, the improvement which comprises the timing layer comprising a polymer latex which is produced by emulsion polymerization of each of at least one monomer selected from the group consisting of monomers of Group (A), at least one monomer selected from the group consisting of monomers of Group (B) and at least one monomer selected from the group consisting of monomers of Group (C), wherein said Group (A) monomers are represented by the following formula (I):

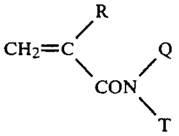

(I)

wherein R represents a hydrogen atom or a methyl group; T represents a hydrogen atom or an aliphatic group; Q represents a $-CH_2OCOR_0$ group, a 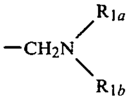 group, a $-CH_2OR_2$ group, a 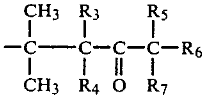 group or a 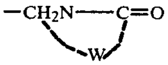 group wherein $R_0$ represents an aliphatic group or an aryl group; $R_{1a}$ and $R_{1b}$, which may be the same or different, each represents an aliphatic group or $R_{1a}$ and $R_{1b}$ combine to form a ring; $R_2$ represents a hydrogen atom or an aliphatic group; $R_3$, $R_4$, $R_5$, $R_6$ and $R_7$, which may be the same or different, each represents a hydrogen atom or a $-CH_2OR_2$ group provided that all of $R_3$ to $R_7$ do not represent hydrogen atoms at the same time; and W represents an atomic group necessary to form a ring together with the —N—CO— linkage; and said Group (B) monomers are polymerizable ethylenically unsaturated monomers having at least one free carboxylic acid group or a free phosphoric acid group or salts thereof; and said Group (C) monomers are monomers other than those monomers described in Group (A) and Group (B) above which are copolymerizable with the monomers described in Group (A) and Group (B) above.

24 Claims, No Drawings

PHOTOGRAPHIC ELEMENT FOR COLOR DIFFUSION TRANSFER PROCESS HAVING A NOVEL NEUTRALIZING SYSTEM

BACKGROUND OF THE INVENTION

1. Field of the Invention

The present invention relates to a photographic element for a color diffusion transfer process (DTR color) and, particularly, to a photographic element having a novel timing layer for neutralization formed from a polymer latex.

2. Description of the Prior Art

Heretofore, a neutralizing layer has been used in the color diffusion transfer process to decrease the pH in a photosensitive layer and to thereby interrupt the formation of a color image (development). Further, in a photographic element for the color diffusion transfer process, a timing layer which controls the period of time at a high pH at which the photographic element is processed based on the temperature has been provided in association with a neutralizing layer as described in W. T. Hanson Jr., *Photographic Sci. & Eng.*, Vol. 20, p. 155 (1976).

It is advantageous in a color diffusion transfer process which uses a dye image providing material which is not diffusible initially but releases a diffusible dye as a result of an oxidation-reduction reaction or a coupling reaction with an oxidation product of the developing agent as described, for example, in Japanese Patent Application (OPI) No. 33826/73 (The term "OPI" as used herein refers to a "published unexamined Japanese patent application"), U.S. Pat. Nos. 3,929,760, 3,931,144 and 3,932,381, to provide a timing layer which has a "temperature-compensating" function. That is, where the development of silver halide is slow and the above-described oxidation-reduction reaction is delayed, deterioration of densities of transferred color images results from the delay in the diffusion of dyes at a low temperature. This can be corrected by prolonging the period of time at which development occurs under a high pH (namely, prolonging the period of time where developing of silver halide and release and transfer of the dyes can occur) using a timing layer having a "temperature-compensating" function, wherein the water permeability of the layer at low temperatures decreases a fixed image density is obtained regardless of variation in the processing temperature.

Examples of timing layers having a "temperature-compensating" function include timing layers composed of polyvinyl alcohol as described in U.S. Pat. No. 3,362,819, layers described in Japanese Patent Application (OPI) No. 22935/74 (corresponding to U.S. Pat. No. 3,785,815) and layers described in *Research Disclosure*, p. 86, November 1976, e.g., timing layers formed from a latex of methyl acrylatevinylidene chloride-itaconic acid copolymers or acrylonitrilevinylidene chloride-acrylic acid copolymers).

However, in the timing layers described in U.S. Pat. No. 3,785,815, the delay in development cannot be adequately compensated for, because the degree of the decrease of the permeability in the timing layer at the low temperature range is small. Further, in the timing layers described in *Research Disclosure*, supra, there is the defect that the cost of production is high, because it is necessary to use vinylidene chloride which requires special equipment for producing the polymer latex since it is hazardous to humans and has a low boiling point.

Furthermore, when a cover sheet including a neutralizing system and a photosensitive sheet comprising an image-receiving element and a photosensitive element coated in turn on a support are combined to form a laminate integral type film unit using a heat seal treatment which is suitable for a high speed mass-production and the film unit is handled somewhat roughly, in particular, at a low temperature, the heat sealed portion of the film unit is liable to be broken and the processing solution is liable to spread between the photosensitive sheet and the cover sheet and leak out of the film unit. In most cases the peeling of the film unit which results in the above-described instance is due to poor adhesion between the timing layer and the layers adjacent thereto. Thus, a timing layer exhibiting good adhesion to the layers adjacent it such that peeling does not occur during manufacture would be desirable.

SUMMARY OF THE INVENTION

A first object of the present invention is to provide a timing layer which has a good adhesion to layers adjacent thereto even at low temperatures.

A second object of the present invention is to provide a photographic element for a color diffusion transfer process in which the peeling of the film unit does not occur when heat sealing is carried out.

A third object of the present invention is to provide a terpolymer latex for a timing layer which can be prepared safely and at low cost in comparison with known polymer latexes for a timing layer.

The above-described objects can be attained effectively in accordance with the present invention which provides a photographic element for the color diffusion transfer process including a neutralizing system for reducing the pH of an aqueous alkaline developing solution which comprises a neutralizing layer and a timing layer, wherein the timing layer is positioned on or under the neutralizing layer in direct or indirect contact therewith such that the aqueous alkaline developing solution reaches the neutralizing layer through the timing layer, the improvement which comprises the timing layer comprising a polymer latex which is produced by emulsion polymerization of each of at least one monomer selected from the group consisting of monomers of Group (A), at least one monomer selected from the group consisting of monomers of Group (B) and at least one monomer selected from the group consisting of monomers of Group (C) wherein:

Group (A) monomers are represented by the following formula (I):

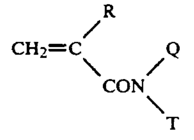

(I)

wherein R represents a hydrogen atom or a methyl group; T represents a hydrogen atom or an aliphatic group; Q represents a $-CH_2OCOR_0$ group, a 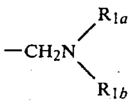 group, a $-CH_2OR_2$ group, a 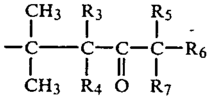 group or a 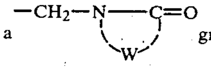 group;

$R_0$ represents an aliphatic group or an aryl group; $R_{1a}$ and $R_{1b}$, which may be the same or different, each represents an aliphatic group or $R_{1a}$ and $R_{1b}$ combine to form a ring; $R_2$ represents a hydrogen atom or an aliphatic group; $R_3$, $R_4$, $R_5$, $R_6$ and $R_7$, which may be the same or different, each represents a hydrogen atom or a $-CH_2OR_2$ group provided that all of the $R_3$ to $R_7$ do not represent hydrogen atoms at the same time; and W represents an atomic group necessary to form a ring together with the —N—CO— linkage;

Group (B) monomers are polymerizable ethylenically unsaturated monomers having at least a free carboxylic acid group or a free phosphoric acid group or a salt thereof; and Group (C) monomers are monomers other than those monomers described in Group (A) and Group (B) above which are copolymerizable with the monomers described in Group (A) and Group (B) above.

DETAILED DESCRIPTION OF THE INVENTION

In the polymer latex used in the present invention, a suitable amount of the Group (A) monomer is about 0.5 to about 40% by weight, preferably 2 to 21% by weight, a suitable amount of the Group (B) monomer is about 1 to about 12% by weight, preferably 2 to 8% by weight, and a suitable amount of the Group (C) monomer is about 48 to about 99% by weight, preferably 77 to 96% by weight. Monomers of Groups (A), (B) and (C) are illustrated in greater detail below. Throughout this specification the monomer compositions (% by weight) are for the latex prior to emulsion polymerization.

The aryl group $R_0$ may be substituted or unsubstituted and is preferably monocyclic. Suitable substituents include a halogen atom, an alkyl group preferably having 1 to 8 carbon atoms, etc. A typical example of the aryl group is a phenyl group.

The aliphatic group for $R_0$ in formula (I) may contain 1 to 8 carbon atoms and includes a straight or branched chain substituted or unsubstituted alkyl group having 1 to 8 carbon atoms and preferably 1 to 3 carbon atoms (e.g., methyl, ethyl, t-butyl, chloromethyl, etc.) and an alkenyl group having 2 to 6 carbon atoms (e.g., ethenyl, propenyl, etc.). The aliphatic group $R_{1a}$ and $R_{1b}$ includes a straight chain or branched chain alkyl group having 1 to 6 carbon atoms and preferably 1 to 3 carbon atoms and may be substituted or unsubstituted (e.g., methyl, ethyl, propyl, etc.). Examples of the substituents for the alkyl group include a hydroxy group, a halogen atom, a straight chain or branched chain alkoxy group having 1 to 6 carbon atoms, etc.

The ring formed by $R_{1a}$ and $R_{1b}$ may be a 5-membered or 6-membered saturated or unsaturated heterocyclic ring formed with the nitrogen atom in the $-CH_2NR_{1a}R_{1b}$ moiety and may contain one or more other hetero atoms such as a nitrogen atom, a sulfur atom or an oxygen atom.

The aliphatic groups for T and $R_2$ include a straight chain, branched chain or cyclic alkyl group having 1 to 18 carbon atoms and preferably 1 to 6 carbon atoms which may be substituted or unsubstituted. Examples of the substituents include a monocyclic aryl group having 6 to 10 carbon atoms such as a phenyl group, a halogen atom such as fluorine, chlorine, bromine, or iodine, etc. The aliphatic groups for T and $R_2$ also include an alkenyl group having 2 to 18 carbon atoms and preferably 2 to 6 carbon atoms such as an allyl group, an ethenyl group, a butenyl group, an oleyl group, etc.

Examples of the alkyl group for T or $R_2$ include a methyl group, an ethyl group, a propyl group, a butyl group, a pentyl group, a hexyl group, an isopropyl group, an isobutyl group, a sec-butyl group, a tert-butyl group, etc.

Examples of the atomic group represented by W include, for example, a $-(CH_2)_3-$ group or a $-(CH_2)_5-$ group, etc., forming a 5- to 7-membered ring.

When Q is a 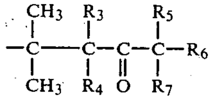 group,

Q represents a methylol product of a diacetoneacrylamide or a diacetone-methacrylamide or a precursor thereof. The methylol product includes a mono-, di-, tri-, tetra- or penta-methylol product. For example, the trimethylol product is a mixture including substituted products in which the degree of the substitution is 3 in which the positions substituted are different as a main component and further contains methylol products in which the degree of the substitution is 1, 2, 4 or 5, and which has an average degree of methylolation of about 3.

Preferred monomers of Group (A) are represented by the following formula (Ia):

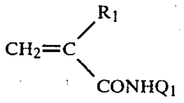 (Ia)

wherein $Q_1$ represents a $-CH_2OR_{2a}$ group or a 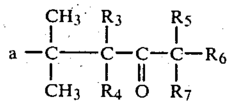

wherein $R_{2a}$ is an alkyl group having 1 to 6 carbon atoms and $R_3$ to $R_7$ have the same definition as in the formula (I) and $R_1$ represents a hydrogen atom; or $Q_1$ represents a $-CH_2OR_2$ group or a 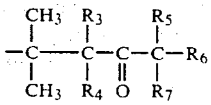 group wherein $R_2$ to $R_7$ have the same definition as in the formula (I) and $R_1$ represents a methyl group.

Specific examples of the compounds represented by the formula (I) or (Ia) include N-hydroxymethyl acrylamide, N-methoxymethyl acrylamide, N-ethoxymethyl acrylamide, N-tert-butoxymethyl acrylamide, N-n-butoxymethyl acrylamide, N-hydroxymethyl methacrylamide, N-methoxymethyl methacrylamide, N-ethoxymethyl methacrylamide, N-butoxymethyl methacrylamide, hydroxymethylated diacetoneacrylamide having a hydroxymethylation degree of about 0.5 to 4.5 and; acrylamide or methacrylamide derivatives such as N-(N',N'-dimethylaminomethyl) methacrylamide, N-(N',N'-dibutylaminomethyl) methacrylamide, N-(morpholinomethyl) methacrylamide, N-[N'-methyl-N'-(2-hydroxyethyl)amino]methyl methacrylamide, N-[N',N'-bis(2-hydroxyethyl)amino]methyl methacrylamide, N-acetoxymethylacrylamide, N-propyloxymethylacrylamide, N-acrylamidomethylpyrrolidone, N-methacrylamidomethyl-ε-caprolactam, N-benzyloxymethylacrylamide, N-lauroxymethylacrylamide, etc., as described in *Makromoleculare Chemie,* Vol. 57, pp. 27-51 (1962), etc.

Of the monomers of Group (B), an unsaturated acid represented by the following general formula (II) or a salt thereof is preferred:

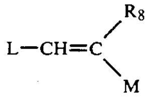
(II)

wherein $R_8$ represents a hydrogen atom or a methyl group; L and M, which may be the same or different, each represents a hydrogen atom, a carboxy group, a carboxyalkylene group (an alkylene moiety having 1 to 3 carbon atoms is preferred), an alkoxycarbonyl group (the alkyl moiety has preferably 1 to 8 carbon atoms and may be a straight chain, branched chain or alicyclic alkyl group), or a $—COO—R'—OPO_3H_2$ group (wherein R' represents a straight chain or branched chain alkylene group and those alkylene groups having 1 to 12 carbon atoms are preferred).

Also, L and M may represent a group in which the carboxy group, the carboxyalkylene group or the $—COO—R'—OPO_3H_2$ group and an alkali metal ion (preferably sodium or potassium) or ammonium ion form a salt. Further, at least one of L and M should be a carboxy group, a carboxyalkylene group, a $—COO—R'—OPO_3H_2$ group or a salt thereof (as described above).

Specific examples of the monomers represented by the general formula (II) include the following:

acrylic acid, methacrylic acid, itaconic acid, maleic acid, crotonic acid, monoalkyl itaconates (for example, monomethyl itaconate, monoethyl itaconate or monobutyl itaconate, etc.), monoalkyl maleates (for example, monomethyl maleate, monoethyl maleate, monobutyl maleate or monooctyl maleate, etc.), citraconic acid, sodium acrylate, ammonium acrylate, ammonium methacrylate, acryloyloxyalkyl phosphates (for example, acryloyloxyethyl phosphate and 3-acryloyloxypropyl-2-phosphate, etc.) and methacryloyloxyalkyl phosphates (for example, methacryloyloxyethyl phosphate (acid phosphoxyethyl methacrylate) and 3-methacryloyloxypropyl-2-phosphate, 3-chloro-2-acid phosphoxypropyl methacrylate, etc.), etc.

Although the monomers of Group (C) may be any of a wide variety of ethylenically unsaturated monomers which are known in the art, a monomer represented by the following general formula (III) is particularly effective

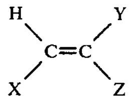
(III)

wherein X represents a hydrogen atom, a methyl group or a $—COOR_9$ group; Y represents a hydrogen atom, a methyl group or a $—(CH_2)_nCOOR_{10}$ group; Z represents a monocyclic aryl group having 6 to 18 carbon atoms (e.g., phenyl, chloromethylphenyl, chlorophenyl, tolyl, methoxyphenyl, acetoxyphenyl, etc.), a $—COOR_{11}$ group, a cyano group, or a halogen atom (e.g., Cl, Br, F, etc.) or an 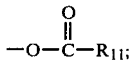;

$R_9$, $R_{10}$ and $R_{11}$, which may be the same or different, each represents an aliphatic group or an aryl group; and n represents an integer of 0 to 3 provided that not more than two of X, Y and Z represent ester moieties at one time.

The aliphatic group for $R_9$ to $R_{11}$ includes a straight chain, branched chain or cyclic alkyl group which may be substituted or unsubstituted. The alkyl group preferably has 1 to 12 carbon atoms. Also include is an alkenyl group having 2 to 6 carbon atoms such as ethenyl, propenyl, etc. Examples of the substituents for the substituted alkyl group include a $C_1$–$C_8$ alkoxy group such as methoxy, ethoxy, isopropoxy, butoxy, etc., a $C_6$–$C_{10}$ aryl group such as phenyl, chlorophenyl, dimethylphenyl, etc., a $C_6$–$C_{10}$ aryloxy group such as phenoxy, chlorophenoxy, etc., a $C_7$–$C_{12}$ arylalkyleneoxy group such as benzyloxy, phenethyloxy, etc., a halogen atom, a cyano group, a $C_2$–$C_8$ acyl group such as acetyl, propionyl, etc., a $C_2$–$C_8$ alkylcarbonyloxy group such as acetoxy, propionyloxy, caproyloxy, etc., a $C_7$–$C_{12}$ arylcarbonyloxy group such as benzoyloxy, chlorobenzoyloxy, etc., an amino group (including a substituted amino group in which the substituents may be an alkyl group, an aryl group, etc., and the number of the substituents is 1 or 2), a hydroxy group, a $C_3$–$C_{10}$ alkoxyalkyleneoxy group such as methoxyethoxy, ethoxyethoxy, butoxyethoxy, etc., a heterocyclic residue (wherein the hetero atom is, e.g., an oxygen atom, a nitrogen atom, a sulfur atom, etc., a 5- or 6-membered ring being preferred, and the ring may be unsaturated or saturated and condensed with an aromatic ring), etc.

Further, the aryl group for $R_9$ to $R_{11}$ includes a substituted or unsubstituted phenyl or a naphthyl group. Examples of the substituents include an alkyl group in addition to the substituents described above for the substituted alkyl group.

Examples of the monomers of Group (C) include monomers such as acrylic acid esters, methacrylic acid esters, crotonic acid esters, vinyl esters, maleic acid diesters, fumaric acid diesters, itaconic acid diesters, styrenes, acrylonitriles, vinyl chloride, etc., wherein the alcohol derived moiety contains 1 to 24 carbon atoms.

Further, specific examples of these Group (C) monomers include acrylic acid esters such as methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-iso-propoxyethyl acrylate, 2-butoxyethyl acrylate, 2-(2-methoxyethoxy)ethyl acrylate, 2-(2-butoxyethoxy)ethyl acrylate, 1-bromo-2-methoxyethyl acrylate, 1,1-dichloro-2-ethoxyethyl acrylate, etc.; methacrylic acid esters such as methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate, benzyl methacrylate, chlorobenzyl methacrylate, octyl methacrylate, N-ethyl-N-phenylaminoethyl methacrylate, 2-(3-phenylpropyloxy)ethyl methacrylate, furfuryl methacrylate, tetrahydrofurfuryl methacrylate, phenyl methacrylate, cresyl methacrylate, naphthyl methacrylate, 2-hydroxyethyl methacrylate, 3-hydroxypropyl methacrylate, 4-hydroxybutyl methacrylate, triethyleneglycol monomethacrylate, 2-methoxyethyl methacrylate, 3-methoxybutyl methacrylate, 2-acetoxyethyl methacrylate, acetoacetoxyethyl methacrylate, 2-ethoxyethyl methacrylate, 2-iso-propoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, etc.; vinyl esters such as vinyl acetate, vinyl propionate, vinyl butyrate, vinyl isobutyrate, vinyldimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl β-phenylbutyrate, vinyl cyclohexylcarboxylate, vinyl benzoate, vinyl salicylate, vinyl chlorobenzoate, vinyl tetrachlorobenzoate, vinyl naphthoate, etc.; styrenes such as styrene, methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid methyl ester, etc.; crotonic acid esters such as butyl crotonate, hexyl crotonate, glycerin monocrotonate, etc.; itaconic acid diesters such as dimethyl itaconate, diethyl itaconate, dibutyl itaconate, etc.; maleic acid diesters such as diethyl maleate, dimethyl maleate, dibutyl maleate, etc.; fumaric acid diesters such as diethyl fumarate, dihexyl fumarate and dibutyl fumarate, etc.

The preferred monomer composition in the copolymer of the latex used in the present invention can be determined on the following considerations: (i) the latex can be prepared at low cost and with ease, (ii) the latex has good stability even when it is stored for a long period of time, (iii) the timing layer formed from the latex has an appropriate permeability of an alkaline aqueous solution and the permeability has the desired temperature dependency, and (iv) the timing layer has good adhesion strength to layers adjacent thereto (the adjacent layer may be a relatively hydrophobic layer formed by coating an organic solvent solution of a polymer) over a wide range of temperature.

A preferred composition of the copolymer is as follows: as a monomer (A), about 0.5 to about 40% by weight of N-hydroxymethyl acrylamide or N-hydroxymethyl methacrylamide, more preferably an N-alkoxymethyl acrylamide or an N-alkoxymethyl methacrylamide; as monomer (B), about 1 to about 12% by weight, more preferably about 2 to about 8% by weight of acrylic acid, methacrylic acid or itaconic acid; and as monomer (C), about 48 to about 99% by weight, more preferably about 77 to about 98% by weight of at least one ethylenically unsaturated monomer represented by the above-described general formula (III).

As monomer (C), two or more copolymerizable components can be used, if desired. For example, in order to obtain a latex having an appropriate minimum film forming temperature (described in detail hereinafter), a hard component and a soft component can be used in an appropriate ratio. In this case, a hard component is an ethylene type monomer of the general formula (III) which forms a homopolymer having a glass transition temperature of 50° C. or more, for example, styrene, acrylonitrile or methyl methacrylate is preferred. On the other hand, soft component is an ethylene type monomer of the general formula (III) which forms a homopolymer having a glass transition temperature of 40° C. or less, for example, a substituted or unsubstituted alkyl acrylate (examples of the substituents include an alkoxy group, a halogen atom, etc.) is preferred.

Typical examples of preferred copolymers of aqueous latexes which can be used to form the timing layer of the present invention are illustrated below.

(1) Styrene/n-butyl acrylate/acrylic acid/N-hydroxymethylacrylamide copolymer: (50:40:3:7)

(2) Styrene/n-butyl acrylate/acrylic acid/N-hydroxymethylacrylamide copolymer: (61:27:4:8)

(3) Methyl methacrylate/n-butyl acrylate/acrylic acid/N-hydroxymethylacrylamide copolymer: (32:58:4:6)

(4) Methyl methacrylate/n-butyl acrylate/acrylic acid/N-hydroxymethylacrylamide copolymer: (63:28:3:6)

(5) Methyl methacrylate/acrylic acid/N-hydroxymethylacrylamide copolymer: (92:4:4)

(6) Butyl methacrylate/acrylic acid/N-hydroxymethylacrylamide copolymer: (90:4:6)

(7) sec-Butyl methacrylate/acrylic acid/N-butoxymethylacrylamide copolymer: (77:3:20)

(8) Ethyl methacrylate/itaconic aicd/hydroxymethylated diacetoneacrylamide* copolymer: (95:2.5:2.5)

* (degree of hydroxymethylation: 2.5)

(9) 2-Acetoxyethyl methacrylate/acrylic acid/N-ethoxymethylacrylamide copolymer: (87:3:10)

(10) Ethyl acrylate/methacrylic acid/N-butoxymethylacrylamide copolymer: (88:6:6)

(11) Propyl methacrylate/maleic acid/N-methoxymethylacrylamide copolymer: (90:2:8)

(12) Styrene/n-butyl acrylate/2-methacryloyloxyethyl phosphate/N-butoxymethylacrylamide copolymer: (50:40:2:8)

(13) Styrene/ethoxyethyl acrylate/acrylic acid/N-hydroxymethylacrylamide copolymer: (43:43:4:10)

(14) Styrene/n-propyl acrylate/itaconic acid/N-methoxymethylethacrylamide copolymer: (40:38:8:14)

(15) Styrene/n-butyl acrylate/acrylic acid/hydroxymethylated diacetoneacrylamide* copolymer: (51.7:41.8:2:4.5)

* (degree of hydroxymethylation: 2.5)

(16) Methyl methacrylate/butyl acrylate/acrylic acid/N-hydroxymethylacrylamide copolymer: (36.1:53.9:2:8)

(17) n-Butyl methacrylate/acrylonitrile/acrylic acid/N-ethoxymethylacrylamide copolymer: (78:6:4:12)

(18) n-Butyl methacrylate/acrylonitrile/itaconic acid/N-hydroxymethylmethacrylamide copolymer: (79:5:2:14)

(19) Styrene/n-butyl acrylate/acrylic acid/N-acetoxymethylacrylamide copolymer: (50:40:3:7)

(20) Styrene/n-butyl acrylate/acrylic acid/N-(morpholinomethyl)methacrylamide copolymer: (48:40:4:8)

All ratios in the above examples are by weight and based on the amount of each monomer added in a synthesis of the polymer latex.

The polymer latex used in the present invention can be synthesized advantageously in a conventional manner with reference to the descriptions appearing in, for example, Japanese Patent Publication No. 29195/72, Japanese Patent Application (OPI) Nos. 37488/73, 76593/73 and 72622/68, British Pat. Nos. 1,211,039 and 961,395, U.S. Pat. Nos. 3,847,615, 3,840,371 3,963,495, 2,795,564, 2,914,499, 3,033,833, 3,547,899, 3,227,672, 3,290,417, 3,262,919, 3,245,932, 2,681,897 and 3,230,275, Canadian Pat. No. 704,778, John C. Petropoulos et al, *Official Digest,* 33, 719–736 (1961), Sadao Hayashi *Emulsion Nyumon* (*Introduction of Emulsion*) (1970), Souichi Muroi, *Chemistry of Polymer Latex* (1970), Takuhiko Motoyama, *Vinyl Emulsion* (1965) and Mike Shider Juang et al, *Journal of Polymer Science, Polymer Chemistry Edition,* 14, 2089–2107 (1976). Needless to say, the polymerization initiator, concentration of reactants, the polymerization temperature, reaction time and the like can be varied widely in accordance with the effect desired. For example, the polymerization is, in general, carried out at 20° to 180° C., preferably 40° to 120° C., using 0.05 to 5% by weight of a free radical polymerization initiator and 0.1 to 10% by weight of an emulsifier based on the amount of monomers to be polymerized.

Suitable polymerization initiators include azo compounds, peroxides, hydroperoxides, redox catalysts, etc., for example, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, 2,2-azobis(2-amidinopropane)hydrochloride and the like.

Suitable emulsifiers include anionic, cationic, amphoteric or nonionic surface active agents and water-soluble polymers, for example, sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyltrimethylammonium chloride, dodecyltrimethylammonium chloride, N-2-ethylhexylpyridinium chloride, polyoxyethylene nonylphenyl ether, polyoxyethylene sorbitanlauryl ester, polyvinyl alcohol, water-soluble polymers, emulsifiers described in Japanese Patent Publication No. 6190/78 and the like.

The average particle size of latexes for the timing layer of the present invention is preferably about 0.05 to about 0.4μ and particularly about 0.05 to 0.2μ. (The average particle size is the number mean of the diameter of the particles measured microscopically in a conventional manner.)

The properties of the polymer latex for the timing layer of the present invention can be appropriately modified. For instance, the stability during storage of a polymer latex may be improved in the following manners:

(1) By introducing a hydrophilic group into the polymer latex

A hydrophilic group may be introduced into the polymer latex which is obtained using a monomer represented by the above-described general formula (I) wherein Q is a $-CH_2OH$ group. For example, sodium hydrogensulfite may be added to the polymer latex whereby the methylol group is modified in accordance with the following reaction scheme:

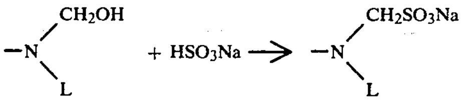

Another technique which can be used is described in C. E. Schildknecht, *Polymer Process,* p. 340, Interscience (1965) wherein sodium amino acetate and sodium hydroxyethanesulfonate modify the methylol group.

(2) By copolymerizing a monomer containing a sulfonic acid group with the monomers of Group (A), Group (B), and Group (C)

Examples of the monomers containing a sulfonic acid group include, for example, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid, etc.), methacryloyloxyalkyl sulfonic acids (for example, methacryloyloxymethyl sulfonic acid, methacryloyloxyethyl sulfonic acid, methacryloyloxypropyl sulfonic acid and methacryloyloxybutyl sulfonic acid, etc.), acrylamido alkyl sulfonic acids (for example, 2-acrylamino-2-methylethanesulfonic acid, 2-acrylamido-2-methylpropanesulfonic acid and 2-acrylamido-2-methylbutanesulfonic acid, etc.), methacrylamido alkyl sulfonic acids (for example, 2-methacrylamido-2-methylethanesulfonic acid, 2-methacrylamido-2-methylpropanesulfonic acid and 2-methacrylamido-2-methylbutanesulfonic acid, etc.), and the like.

In general, the amount of the hydrophilic group, such as a sulfonic acid group, in the polymer latex is about 0.1 to 80 mol% based on the total number of cross-linking groups such as N-methylol groups.

The timing layer of the present invention can be produced by applying at least one of the polymer latexes produced by the above-described processes just as it is or after dilution with water to the neutralizing layer directly or indirectly. As used herein, the term "indirectly" means that the timing layer of the present invention is applied to the neutralizing layer through another timing layer (e.g., a cellulose acetate layer) or an adhesion improving layer (e.g., a subbing layer), etc. Examples of adhesion improving layers include layers containing a hydrophilic colloid such as gelatin or polyvinyl alcohol, etc.

Also, the layer which is formed by coating the above-described reactive latex according to the present invention at a thickness of about 0.1 to about 1μ may be used in the role of an adhesion improving layer and a known latex timing layer can be applied thereto.

Preferred examples of the other timing layers described above include a timing layer produced by coating a mixture of cellulose acetate and a maleic anhydride copolymer such as a styrene-maleic anhydride copolymer, a methyl vinyl ether-maleic anhydride copolymer, a vinyl acetate-maleic anhydride copolymer as described in U.S. Pat. Nos. 4,029,849 and 4,056,394, a timing layer composed of a monomer of hydroxyethyl acrylate or hydroxyethyl methacrylate or a copolymer of such a monomer and other copolymerizable vinyl monomers as described in Japanese Patent Publication No. 46496/77, etc.

The photographic element of the present invention may be a cover sheet having the neutralizing system incorporated therein for covering the "photosensitive element"; or it may be a so-called integral laminated film unit which comprises a support, a photosensitive sheet comprising an "image-receiving element" and a "photosensitive element", a "cover sheet" having a neutralizing system according to the present invention and a "processing element" which is provided so that it can be spread between the photosensitive element and the cover sheet, which are applied to the support in turn to form the film unit. An integral type film unit is preferred.

Further, the photographic element of the present invention may be a so-called strippable film unit which can be utilized as a negative, wherein a developing solution is spread between an image-receiving element applied to a support and an element comprising a neutralizing layer, a timing layer (which may be two or more layers and includes a timing layer according to the present invention) and a photosensitive element applied to a support in this order.

Further, the neutralizing system of the present invention may be present in the image-receiving element, although such an embodiment is less preferred than the others.

The timing layer of the present invention can be formed by known methods, for example, using a spiral rod coater, an extrusion coater, a dip coater or an air knife coater, etc.

Various kinds of additives conventionally used in the latex field may be added to this latex, according to the function thereof. Specific examples are described in *Product Licensing Index*, Vol. 92, No. 9232 (December 1971). It is preferred to use, as described at pages 107 to 108 of the aforementioned literature, surface active agents as a coating aid, solvents facilitating film formation (for example, methyl Cellosolve, ethyl Cellosolve, cyclohexanone, toluene, etc.), matting agents which are used to prevent adhesion during preparation or use such as silica powder or polymer beads, etc., bulking agents for improving the strength of the film (for example, colloidal silica, titanium dioxide, carbon black or diatomaceous earth, etc.) and plasticizers for improving the flexibility of the film (for example, phthalic acid esters such as dibutyl phthalate or dihexyl phthalate, etc., and phosphoric acid esters such as trialkyl phosphates or tricresyl phosphate, etc.), etc. A preferred amount of the above-described surface active agents for improving wetting is about 0.05 to about 0.5% (by weight). Although the amounts of these other additives can be suitably chosen depending on the effect desired, a preferred amount of each of the additives ranges from about 0.1 to about 20% (by weight) and particularly 1 to 10% (by weight) based on the solid content of the latex polymer.

When a solution of the polymer latex having an N-hydroxymethyl group which is a reactive group or an alkoxymethyl group which is a precursor of the hydroxymethyl group according to the present invention is coated, a condensation catalyst of the reactive group can be used. In general, the lower the pH of the coating solution is, the higher is the activity of the above-described reactive group, but the stability during storage of the coating solution decreases. By converting the functional group to a precursor, for example, by alkyl etherification, an improvement in the stability is achieved. A preferred pH of the coating solution is about 1 to about 6.5 and particularly about 2 to about 5. When an organic or inorganic strong acid such as p-toluene sulfonic acid or hydrochloric acid, etc., is used as the condensation catalyst of the reactive group, superior results are obtained. Further, the use of an ammonium salt of such strong acids as the condensation catalyst is preferred to provide a latex timing layer having a good adhesion property to the adjacent layers without a decrease in the pH of the coating solution. Specific examples of the ammonium salts of inorganic or organic strong acids include ammonium chloride, ammonium bromide, ammonium iodide, ammonium nitrate, ammonium p-toluene sulfonate, etc. A preferred amount added ranges from about 0.1 to about 100 millimol and particularly about 1 to about 10 millimol per 100 g of the solid content.

Although the thickness of the timing layer of the present invention advantageously ranges from about 0.5 to about 20μ and particularly 2 to 8μ, there is no limitation on the thickness. It can be suitably determined according to the use of the timing layer. In terms of coating amounts, the timing layer of the present invention is coated in an amount of about 0.55 to about 22 g (solid content)/$m^2$ and particularly 2 to 9 g (solid content)/$m^2$.

A latex timing layer can be produced from a mixture of two or more latexes each having a different monomer composition. Two or more latexes each having a different minimum film forming temperature may be blended. That is, by coating a mixture of a polymer latex having a minimum film forming temperature of 35° C. or less (Group I) and a polymer latex having a minimum film forming temperature of more than 35° C. (Group II), a latex timing layer which is almost free from the blocking defects is provided. The term "minimum film forming temperature (MFT)" used herein is a characteristic value known to one skilled in the art, and it can be easily measured with respect to a latex having a MFT of 25° C. or less by a standard testing method of American Standard Bureau, i.e., ASTM-D2354-68. Also, with reference to a latex having an MFT of more than 25° C. its MFT can be measured by providing the temperature gradient at a desired temperature according to the method described in *Journal of Applied Polymer Science*, Vol. IV, No. 10, pp. 81-85 (1960).

Examples of latexes having an MFT of more than 35° C. include polymer latexes containing 65% by weight or more of styrene or 69% by weight or more of methyl methacrylate as a copolymerizable monomer component (C) of the present invention. Examples of latexes having an MFT of 35° C. or less include polymer latexes containing 36% by weight or more of N-butyl acrylate as a copolymerizable monomer component (C) of the present invention. Preferably the latex is free from water-soluble materials other than the surfactants which are used as emulsifying aids or coating aids during preparation of the latex or timing layer.

Further, the term "blocking defects" is a defect in which the timing layer adheres to the back surface of the film when the film having the latex timing layer coated on a support as an outermost layer or a defect in which undesirable adhesion to a surface of a photosensitive element after the formation of a DTR color photographic film unit occurs.

The mixing ratio of the polymer latex of Group I and the polymer latex of Group II (I:II) is preferably about 95:5 to 20:80 and particularly about 30:70 to 70:30 in solid content by weight.

To dry the timing layer of the present invention on coating, infrared rays, ultrasonic waves, etc., may be used. A contact heat-transmission method using a heating drum, or a method of using hot air can also be suitably utilized. In any case, it is preferred for a transparent film to be produced from the latex by applying sufficient heating to evaporate the residual water or other volatile components.

The timing layer used in the present invention not only can control the rate of alkali absorption by the neutralizing layer but also can control migration by diffusion of materials in the layers which are positioned on the side of the timing layer opposite the silver halide emulsion layers to the silver halide emulsion layer side. An example of a layer which is positioned on the side opposite the silver halide emulsion layers is the neutralizing layer, or a cellulose acetate timing layer which is provided between the neutralizing layer and the latex timing layer. It is often desired to add additives to the neutralizing layer or the above-described cellulose acetate timing layer which can cause disadvantageous chemical reactions if they reach the silver halide layers at the initial stage of the development (for example, development inhibiting agents or precursors thereof, development inhibitor releasing couplers (DIR couplers) and hydroquinones, and compounds which release a development inhibitors by hydrolysis as described in French Pat. No. 2,282,124) or reducing agents which prevent fading. By application of the timing layer of the present invention, it becomes possible to isolate these additives so that they do not reach the silver halide emulsion layers at the initial stage of the development and to time their diffusion such that they function after sufficient development has progressed. Of course, it is also possible to control the effect of these additives with temperature.

For example, when a development inhibiting agent or a precursor thereof is added to the neutralizing layer or the above-described cellulose acetate timing layer, development is not inhibited at the beginning of the development at any temperature but it is inhibited after sufficient development has progressed until finally development is stopped. Accordingly, it becomes possible to prevent the occurrence of stains or prevent an increase in image densities by excessive development. Particularly, when the development temperature is high, stain easily occurs due to excessive development, since the development rate is high. In such a case, if the timing layer of the present invention which has the characteristic that the permeability markedly increases as the temperature increases is used, the above-described disadvantages are suitably prevented.

Development inhibitor releasing type couplers (DIR coupler), which can be used herein, include those described in, for example, U.S. Pat. Nos. 3,227,554, 3,617,291, 3,701,783, 3,790,384 and 3,632,345, German Patent Application (OLS) Nos. 2,414,006, 2,454,301 and 2,454,329, British Pat. No. 953,454 and Japanese Patent Application (OPI) No. 69624/77. Other compounds which release a development inhibitor during development which can be used, are those described in, for example, U.S. Pat. Nos. 3,297,445 and 3,379,529 and German Patent Application (OLS) no. 2,417,914.

When the latex timing layer of the present invention is used, the effect of maintaining a high pH for a long period at a lower temperature is particularly excellent and a reduction in the transfer image densities which is hitherto liable to occur is nearly completely corrected.

Further, when the timing layer of the present invention is used, the water permeability markedly increases as the temperature increases and it is possible to increase the water permeation rate about 2.5 times for every 10° C. increase in temperature where the temperature of measurement is varied in a range from room temperature to higher temperatures. In this regard, since the processing solution easily reaches the neutralizing layer by passing through the timing layer of the present invention at high temperature, there is the advantage that the delayed neutralization of processing solution, namely, the formation of excess transfer images can be prevented. Thus, when the timing layer of the present invention is used, a temperature compensating effect is obtained, that is, a fixed transfer image density is obtained in spite of a variation in the processing temperature.

Further, since the timing layer used in the present invention has a greatly improved film strength and adhesion to the adjacent layers, the timing layer per se does not split and it does not split at the interfaces between adjacent layers when mechanical action is applied from outside to heat seal the element. Therefore, peeling of the film unit during manufacture or at the time when a processing solution is spread after photographing is prevented.

Further, the adhesion strength of the timing layer after heat sealing using a hot melt type adhesive is extremely high from room temperature to a low temperature of about 0° C. and thus the timing layer of the present invention is particularly suitable to high speed mass-production of film units utilizing a heat seal treatment system.

As a hot melt type adhesive described above, any hot melt type adhesive conventionally known can be used. In this case, the heat seal treatment is carried out by contacting a support coated with a hot melt type adhesive with the timing layer of the photographic element according to the present invention in a face to face relationship and placing them between preheated metal blocks. As hot melt type adhesives, it is particularly advantageous to use polyethylene-vinyl acetate type adhesives, adhesives described in *Research Disclosure*, Vol. 158, No. 15839 (June, 1977), etc., if necessary, coated on both sides of a polyethylene terephthalate film, a polycarbonate film or a triacetyl cellulose film, etc. The strength against peeling off after the heat seal treatment can be easily determined using a conventional stretching tester.

Furthermore, there is the advantage that the cost of production is low, because the latex used in the present invention can be produced from inexpensive starting materials using simple equipment.

Evaluation of the advantages and usefulness of the timing layer of the present invention which has a characteristic that water permeability markedly increases as the temperature increases can be carried out by observing the correlation between the variation in the photographic development rate with temperature and the variation in water permeability with temperature. The water permeability of the timing layer is preferably described in terms of the time required for the pH of an alkaline processing solution to decrease upon passing through the timing layer and being absorbed in the neutralizing layer at a given temperature. In this case, when the time required for the pH to reach 10 (it is understood in the photographic art that photographic development is substantially stopped at this pH) is measured, it has been found that there is considerable correspondence between the temperature-dependence pattern of the "neutralizing timing" and the temperature-dependence of the maximum densities of transferred image. The time required for a pH of 10 to be reached can be preferably measured using a pH indicating dye which does not decompose under alkaline conditions. It is particularly preferred to measure the time using a Thymolphthalein dye whose color changes at a pH of 10 as the pH indicator as described in Example hereinafter.

When the variation in the time it takes the pH of an alkaline processing solution to decrease to a pH of 10 with temperature is measured for the timing layer of the present invention and prior art timing layers using Thymolphthalein as a pH indicator as shown in Example 1 of the present invention, it has been found that there is a considerable relationship between a variation in time with temperature to a variation of image transfer densities with temperature. It is preferred for the measurement temperature to be 25° C. which is a normal temperature and 15° C. and a preferred embodiment of the timing layer of the present invention is prescribed on the basis of the ratio of the time required for reaching a pH of 10 at 15° C. to that at 25° C., namely, $T_{15}/T_{25}$ ($T_{15}$ and $T_{25}$ are each the time required for reaching a pH of 10 at 15° C. or at 25° C.).

It is preferred for the value of $T_{15}/T_{25}$ measured according to the method described in Example 1 given hereinafter to be in the range of about 2.5 to about 6.0 and, particularly, 3.0 to 5.0.

The silver halide emulsions which can be used in the present invention are hydrophilic colloid dispersions of silver chloride, silver bromide, silver chlorobromide, silver iodobromide, silver chloroiodobromide or a mixture thereof. Although the composition of the halides is suitably selected depending on the purpose of the light-sensitive materials or the processing conditions, a silver iodobromide or silver chloroiodobromide having an iodine content of about 1 mol% to about 10 mol% (a chloride content of about 30 mol% or less) and the balance of bromide is particularly preferred. In the present invention, although emulsions wherein grains easily form latent images on the surface thereof may be used, it is preferred to use internal latent image type direct reversal emulsions as described in U.S. Pat. Nos. 2,497,875, 2,588,982, 3,456,953, 3,761,276, 3,206,313, 3,317,332, 3,761,266, 3,850,637, 3,923,513, 3,736,140, 3,761,267, and 3,854,949.

Suitable color image-providing materials for the diffusion transfer process used in combination with the photographic emulsions are the compounds described in, for example, U.S. Pat. Nos. 3,227,551, 3,227,554, 3,443,939, 3,443,940, 3,658,524, 3,698,897, 3,725,062, 3,728,113, 3,751,406, 3,929,760, 3,931,144 and 3,932,381, British Pat. Nos. 840,731, 904,364 and 1,038,331, German Patent Application (OLS) Nos. 1,930,215, 2,214,381, 2,228,361, 2,242,762, 2,317,134, 2,402,900, 2,406,626 and 2,406,653 and Japanese Patent Application (OPI) Nos. 114424/74, 126332/74, 33826/77, 126331/74, 115528/75, 113624/76, 104343/76, 114930/76, 8827/77, 23628/78, 143323/78 and 149328/78, and U.S. patent application Ser. No. 917,759, filed June 21, 1978 and Ser. No. 956,698, filed Nov. 1, 1978. Particularly, color image-providing materials which are not diffusible initially but release a diffusible dye as a result of an oxidation-reduction with an oxidation product of the developing agent (hereinafter referred to as DRR compounds) are preferred.

Specific examples of DRR compounds include 1-hydroxy-2-tetramethylenesulfamoyl-4-[3'-methyl-4'-(2''-hydroxy-4''-methyl-5''-hexadecyloxyphenylsulfomoyl)phenylazo]naphthalene as a magenta dye image-forming material, and 1-phenyl-3-cyano-4-{3'-[2''-hydroxy-4''-methyl-5''-(2''',4'''-di-t-pentylphenoxyacetamido)phenylsulfomoyl]phenylazo}-5-pyrazolone as a yellow dye image-forming material in addition to the compounds described in the above mentioned patents.

In the present invention, in using DRR compounds, any silver halide developing agent can be used if such is capable of cross-oxidizing DRR compounds. Such a developing agent may be incorporated in the alkaline processing compositions (processing element) or may be incorporated in a suitable layer in the photosensitive element. Examples of developing agents which can be used in the present invention include the following compounds: hydroquinone, aminophenols such as N-methylaminophenol, 1-phenyl-3-pyrazolidone, 1-phenyl-4,4-dimethyl-3-pyrazolidone, 1-phenyl-4-methyl-4-oxymethyl-3-pyrazolidone, N,N-diethyl-p-phenylenediamine, 3-methyl-N,N-diethyl-p-phenylenediamine and 3-methoxy-N-ethoxy-p-phenylenediamine, etc.

Of these compounds, black-and-white developing agents generally having the ability to reduce stain formation of the image-receiving layer (mordanting layer) are particularly preferred.

The direct reversal photographic emulsions used in the present invention can be used to form positive images directly by conducting the developing in the presence of a fogging agent after imagewise exposing to light or by applying a uniform exposure (a high illuminance exposure for a short time, namely, exposure for $10^{-2}$ seconds or less, or a low illuminance exposure for a long time) in surface development processing after imagewise exposing to light, as described in U.S. Pat. No. 2,456,953. It is preferred to use a fogging agent because the degree of fogging can be easily controlled. Although the fogging agent may be added to the developing solution, it is more preferred to incorporate the fogging agent in the light-sensitive material. Suitable fogging agents which can be used in emulsions include hydrazines described in U.S. Pat. Nos. 2,588,982 and 2,568,785, hydrazides and hydrazones described in U.S. Pat. No. 3,227,552, and quaternary salt compounds described in British Pat. No. 1,283,835, Japanese Patent Publication No. 38164/74 and U.S. Pat. Nos. 3,734,738, 3,719,494 and 3,615,615.

The amount of the fogging agent used here can be widely varied depending on the results required. Where the fogging agent is added to the light-sensitive materials, although the amount varies depending on the fogging agent used, the fogging agent is generally used in a range of about 0.1 mg to about 1,500 mg/mol of Ag and preferably 0.5 mg to 700 mg/mol of Ag.

Where the fogging agent is added to the developing solution, the fogging agent is generally used in a range of about 0.05 to 5 g, preferably 0.1 to 1 g, per liter of the developing solution. Where the fogging agent is incorporated in a layer in the light-sensitive material, it is effective for the fogging agent to be rendered non-diffusible. A ballast group commonly used for couplers can be linked to the fogging agent to render it non-diffusible.

Further, diffusion transfer positive images can also be obtained using a DIR reversal emulsion process as described in U.S. Pat. Nos. 3,227,551, 3,227,554 and 3,364,022 or a reversal emulsion process by dissolution physical development as described in British Patent 904,364. Processes for forming color diffusion transfer images are described in U.S. Pat. Nos. 3,227,550 and 3,227,552 and British Pat. No. 1,330,524, etc.

Typical color developing agents which can be used with diffusible dye releasing type couplers (DDR couplers) in the present invention are p-phenylenediamine derivatives described in U.S. Pat. Nos. 3,227,552, 2,559,643 and 3,813,244. Further, p-aminophenol derivatives as described in Japanese Patent Application (OPI) No. 26134/73 can be advantageously used.

The image-receiving element should have a mordanting layer composed of a mordanting agent such as poly-4-vinyl pyridine latex (particularly, in polyvinyl alcohol) as described in U.S. Pat. No. 3,148,061, polyvinylpyrrolidone as described in U.S. Pat. No. 3,003,872 and polymers containing quaternary ammonium salt groups or phosphonium salt groups as described in U.S. Pat. Nos. 3,239,337, 3,547,649, 3,709,690, 3,958,995, 3,770,439 and 3,898,088 and German Patent Application (OLS) No. 2,264,073, etc. The basic polymers described in U.S. Pat. Nos. 2,882,156, 3,625,694 and 3,709,690 are also effective as mordanting agents. In addition, mordanting agents described in U.S. Pat. Nos. 2,484,430, 3,958,995, 3,271,147, 3,184,309 and 3,271,147, etc., are effective.

The photographic element for DTR color of the present invention has a support which does not undergo any marked dimensional change during processing. Examples of such supports include those used in conventional photographic light-sensitive materials such as cellulose acetate films, polystyrene films, polyethylene terephthalate films and polycarbonate films, etc. In addition, examples of effective supports include paper and laminated paper, whose surface is laminated with a water-impermeable polymer such as polyethylene.

Typical examples of preferred acid materials composing the neutralizing layer used in the present invention include materials described and U.S. Pat. Nos. 2,983,606, 2,584,030, 3,362,819, 3,765,885 and 3,819,371 and French Pat. No. 2,290,699. Specific examples are polymethacrylic acid, a copolymer of acrylic acid and methacrylic acid having various copolymerizing ratio, a copolymer of acrylic acid or methacrylic acid with when vinyl type monomer (for example, an acrylic acid ester, a methacrylic acid ester, a vinyl ether, an acrylamide, a methacrylamide, etc.) having various copolymerizing ratio (preferably having 50 to 90 mol% of acrylic acid or methacrylic acid), and the like. Of these polymers, polyacrylic acid and acrylic acid-butyl acrylate copolymer are recommended to use. The neutralizing layer may contain polymers such as cellulose nitrate or polyvinyl acetate and a plasticizer as described in U.S. Pat. No. 3,557,237 in addition to the acid materials. The acid materials may be incorporated into the film unit in the form of microcapsules as described in German Patent Application (OLS) No. 2,038,254.

The processing composition used in the present invention is a liquid composition containing processing components necessary for the development of the silver halide emulsions and for formation of the diffusion transfer dye images, wherein the solvent is mainly water and may contain hydrophilic solvents such as methanol or methyl Cellosolve. The processing composition contains an alkali in an amount sufficient to maintain the pH required for the development of the emulsion layers and to neutralize acids (for example, hydrohalic acids such as hydrobromic acid or carboxylic acids such as acetic acid, etc.) formed during the steps of development and dye image formation. Examples of alkalis which can be used include alkali metal salts, alkaline earth metal salts or amines such as lithium hydroxide, sodium hydroxide, potassium hydroxide, a dispersion of calcium hydroxide, alkali metal salts of weak acids or alkaline earth metal salts of weak acids and amines such as tetramethylammonium hydroxide, sodium carbonate, trisodium phosphate or diethylamine, etc. It is preferred to add a caustic alkali in such a concentration that the pH becomes about 10 or more and preferably 12–14 at room temperature.

A further preferred processing composition contains hydrophilic polymers having a high molecular weight such as polyvinyl alcohol, hydroxyethyl cellulose or sodium carboxymethyl cellulose. These polymers not only provide the processing composition with a viscosity of more than about 1 poise and preferably a viscosity in the range of several hundred (500–600) to 1,000 poises at room temperature which facilitates uniform spreading of the composition upon processing but also forms a nonfluid film to help unify the film unit after processing when the processing composition is concentrated by diffusion of the aqueous solvent into the photosensitive element and the image-receiving element during processing. After the formation of the diffusion transfer dye images is substantially completed, this polymer film inhibits movement of coloring components into the image-receiving layer to prevent a deterioration of the images.

It is sometimes advantageous for the processing composition to contain light absorbing materials such as $TiO_2$, carbon black or a pH indicator or desensitizing agents described in U.S. Pat. No. 3,579,333 in order to prevent fogging of the silver halide emulsion by outside light during processing. Further, development inhibiting agents such as benzotriazole may be added to the processing composition, if desired.

It is preferred for the above-described processing composition to be used in a rupturable container, e.g., as described in U.S. Pat. Nos. 2,543,181, 2,643,886, 2,653,732, 2,723,051, 3,056,491, 3,056,492 and 3,152,515, etc.

When the photographic element of the present invention is a photographic film unit, namely, a film unit capable of being processed by passage through a pair of opposing pressure applying members, the film unit preferably comprises the following elements:

(a) at least one light-sensitive silver halide emulsion layer associated with a dye image-providing substance coated on a support (photosensitive element), (b) image-receiving layer (image-receiving element), (c) alkaline processing composition, preferably contained in a rupturable container set in the interior of the film unit, and containing a silver halide developing agent, and (d) a combination of a neutralizing layer for neutralizing the alkaline processing composition and a latex timing layer according to the present invention (neutralizing system).

The following examples are given to illustrate the present invention in greater detail.

EXAMPLE 1

On a polyethylene terephthalate film having a thickness of 100μ, a neutralizing layer prepared in the following manner (I) below and a cellulose acetate timing layer prepared in the following manner (II) below were applied in turn. Further, on the timing layer, the polymer latex was coated in the amount shown in Table A, and dried at 70° C. for 3 minutes and then at 120° C. for 5 minutes to prepare the timing layer according to the present invention.

(I) Application of Neutralizing Layer 3.8 g of 5-(2-cyanoethylthio)-1-phenyltetrazole was dissolved in 1 kg of a 20% solution of acrylic acid-butyl acrylate copolymer (molar ratio 8:2) having an average molecular weight of 50,000 [solvent: acetone-water 3:1 (by volume)]. This solution was applied in an amount of 110 g per square meter using an extrusion coater and dried with dry air having a velocity of 5 m per second, a temperature of 120° C. and a dew point of 5° C. for 5 minutes to obtain a film having a thickness of about 20μ.

(II) Application of Cellulose Acetate Timing Layer 55 g of cellulose acetate having an acetylation degree of 52.1% (weight of acetic acid released by hydrolysis: 0.521 g per g of sample) (LM-70 produced by Daisel Ltd.) and 5 g of a styrene-maleic acid anhydride copolymer (molar ratio 1:1) having an average molecular weight of 10,000 were dissolved in a solvent mixture of acetone and cyclohexanone (vol ratio of 3:1). This solution was applied to the neutralizing layer produced by the method shown in (I) above in an amount of 50 g per square meter using an extrusion coater and dried with dry air having a velocity of 4 m per second, a temperature of 80° C. and a dew point of 5° C. to obtain a film having a thickness of about 2.6μ.

TABLE A

List of Photographic Elements for Testing

| Cover Sheet No. | Polymer Latex* | Latex Timing Layer Dry Thickness (μ) |
|---|---|---|
| 1 | (1) | 3 |
| 2 | (3) | " |
| 3 | (6) | " |
| 4 | (1) and (5) [6:4 (weight ratio)] | " |
| 5 (Comparison) | (a) | " |
| 6 (Comparison) | (b) | " |

*Latexes (1), (3), (5) and (6) are the above-described polymer latexes according to the present invention. Latex (a) is a polymer latex of styrene/n-butyl acrylate/acrylic acid copolymer (ratio by weight: 51.7:42.3:6), and Latex (b) is a polymer latex of styrene/butyl acrylate/acrylic acid/glycidyl acrylate copolymer (ratio by weight: 47.9:38.1:2:12) as described in U.S. Patent Application Serial No. 966,407, filed December 4, 1978.

Each of Cover Sheet Nos. 1 to 6 was placed face-to-face with a pH indicator coating film prepared by the method described in (III) below and an alkaline viscous solution prepared by the method shown in (IV) below was spread between them in a liquid thickness amount of 120μ. Then, the optical density on the pH indicator coating film was measured. The period of time required for reducing by half the reflection density of the high pH color (blue) of Thymolphthalein by neutralization (this period of time is presumed to be the period of time for reaching a pH of 10) at 25° C. and that at 15° C. were measured. The results of the tests are shown in Table B below.

(III) Production of pH Indicator Coating Film

To a polyethylene terephthalate film having a thickness of 180μ, a 7% solution of gelatin containing 28.5 mg of Thymolphthalein per g of gelatin [solvent: a mixture of water-methanol (4:1 by volume)] was applied in an amount of 100 g per square meter to form a film having a thickness of about 6.5μ. To the resulting film, a dispersion of titanium dioxide (solid content 10%) composed of 9 g of titanium dioxide per g of gelatin was applied in an amount of 300 g per square meter to form a white film having a dry thickness of about 9μ. Further, to the resulting film, the same solution of gelatin containing Thymolphthalein described above was applied in the same manner and dried to complete the application.

(IV) Preparation of Viscous Alkaline Processing Solution 30 g of hydroxyethyl cellulose (Natrosol 250-HR, produced by Hercules, Inc.) and 30 g of sodium hydroxide were dissolved in 940 g of water with stirring and the solution was used after defoaming.

As is clear from a comparison of the values shown in Table B below, where the timing layer of the present invention is used, the temperature dependency of the alkaline permeability is substantially the same as that of a comparison timing layer.

TABLE B

| Cover Sheet No. | Neutralizing Time (minute) 25° C. ($T_{25}$) | 15° C. ($T_{15}$) | $T_{15}/T_{25}$ |
|---|---|---|---|
| 1 | 10.3 | 42.2 | 4.10 |
| 2 | 9.91 | 45.59 | 4.60 |
| 3 | 10.5 | 44.63 | 4.25 |
| 4 | 9.81 | 38.85 | 3.96 |
| 5 (Comparison) | 10.0 | 56.1 | 5.10 |
| 6 (Comparison) | 10.5 | 47.4 | 4.51 |

EXAMPLE 2

Processing temperature tolerance was examined for the photographic elements (Cover Sheet Nos. 1 to 6) prepared in Example 1 using the following photosensitive sheet (an image-receiving element and a photosensitive element were applied to the same support) and a processing solution (processing element).

Production of Photosensitive Sheet

To a transparent polyethylene terephthalate support having a thickness of 180μ, the following layers were provided in turn:

(1) a layer comprising a mordanting agent (3.0 g/m²) of the following formula:

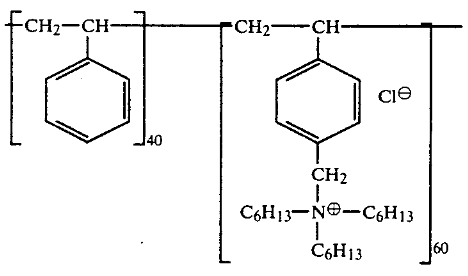

and gelatin (3.0 g/$m^2$)

(2) a layer comprising titanium dioxide (20 g/$m^2$) and gelatin (2.0 g/$m^2$)

(3) a layer comprising carbon black (2.5 g/$m^2$) and gelatin (2.5 g/$m^2$)

(4) a layer comprising cyan image-forming material (0.50 g/$m^2$) of the following formula:

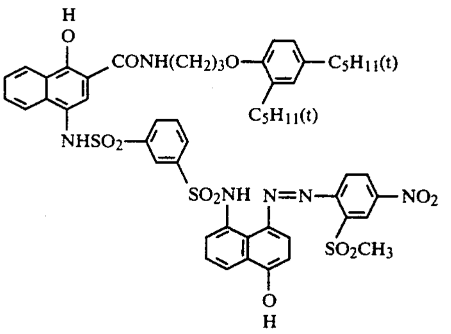

diethyl laurylamide (0.25 g/$m^2$) and gelatin (1.14 g/$m^2$)

(5) a layer comprising a red-sensitive internal latent image type direct reversal silver iodobromide emulsion (composition of halogen in silver halide: 2% by mol iodide; amount of silver: 1.9 g/$m^2$; gelatin: 1.4 g/$m^2$), a fogging agent (0.028 g/$m^2$) of the following formula:

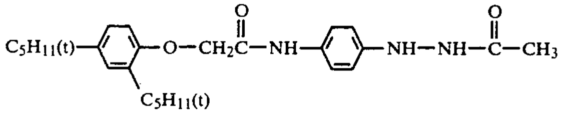

and sodium pentadecylhydroquinone sulfonate (0.13 g/$m^2$)

(6) a layer comprising gelatin (2.6 g/$m^2$) and 2,5-dioctylhydroquinone (1.0 g/$m^2$)

(7) a layer comprising a magenta dye image-forming material (0.45 g/$m^2$) of the following formula:

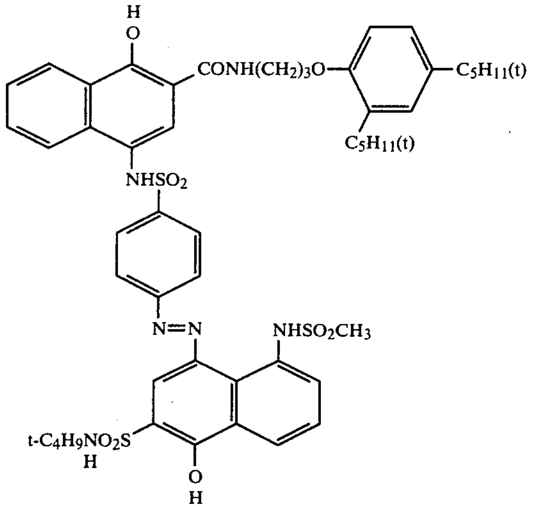

diethyl laurylamide (0.10 g/$m^2$), 2,5-di-t-butylhydroquinone (0.0074 g/$m^2$) and gelatin (0.76 g/$m^2$)

(8) a layer comprising a green-sensitive internal latent image type direct reversal silver iodobromide emulsion (composition of halogen in silver iodobromide: 2% by mol iodide; amount of silver: 1.4 g/$m^2$, gelatin: 1.0 g/$m^2$), the same fogging agent as described for layer (5) (0.024 g/$m^2$) and sodium pentadecylhydroquinone sulfonate (0.11 g/$m^2$)

(9) a layer comprising gelatin (2.6 g/$m^2$) and 2,5-dioctylhydroquinone (1.0 g/$m^2$)

(10) a layer comprising a yellow image-forming material (0.78 g/$m^2$) of the following formula:

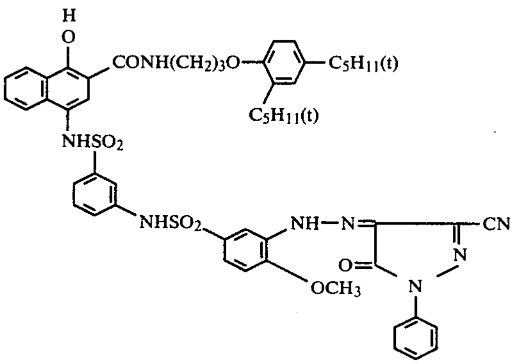

diethyl laurylamide (0.16 g/$m^2$), 2,5-di-t-butylhydroquinone (0.012 g/$m^2$) and gelatin (0.78 g/$m^2$)

(11) a layer comprising a blue-sensitive internal latent image type direct reversal silver iodobromide emulsion (composition of halogen in silver iodobromide: 2 mol% iodide; amount of silver: 2.2 g/$m^2$; gelatin: 1.7 g/$m^2$), the same fogging agent as described for layer (5) (0.020 g/$m^2$) and sodium pentadecylhydroquinone sulfonate (0.094 g/$m^2$), and

(12) a layer comprising gelatin (0.94 g/$m^2$)

| Processing Solution: | |
|---|---|
| 1-Phenyl-4-methyl-4-hydroxymethyl-pyrazolidinone | 10 g |
| Methylhydroquinone | 0.18 g |
| 5-Methylbenzotriazole | 4.0 g |
| Sodium Sulfite (anhydrous) | 1.0 g |

-continued

| Processing Solution: | |
|---|---|
| Sodium Carboxymethylcellulose | 40.0 g |
| Carbon Black | 150 g |
| Potassium Hydroxide (28% aq. soln.) | 200 cc |
| $H_2O$ | 550 cc |

0.8 g of the processing solution having the above-described composition was placed in a container which was rupturable on pressing.

Processing

For evaluation the above-described cover sheet was superposed on the above-described photosensitive sheets. After exposure to light through the cover sheet using a color test chart, the above-described processing solution was spread between both sheets in a liquid thickness of 85μ. (Spreading was carried out using pressing rolls.) Processing was carried out at 25° C. and 15° C., respectively. After processing, the blue density, the green density and the red density formed on the image-receiving layer were measured through the transparent support of the photosensitive sheet using a Macbeth reflection densitometer. (The measurement was carried out after a lapse of sufficient time for the image densities of reach equilibrium.) The values of the maximum transfer density when they reached the fixed optical density are shown in Table C below.

It can be seen from the results shown in Table C that substantially no difference in transfer density between 15° C. and 25° C. is observed in all of the cover sheets for evaluation.

Further, where the cover sheets were used for photographing a person as a model, the cover sheets according to the present invention showed sufficient processing temperature tolerance (a temperature ranging from 15° to 35° C.).

TABLE C

| Cover Sheet No. | Processing at 25° C. Blue Density ($D_B$) | Green Density ($D_G$) | Red Density ($D_R$) | Difference of Density between 15° C. and 25° C. $\Delta D_B$ | $\Delta D_G$ | $\Delta D_R$ | Difference of Density between 25° C. and 35° C. $\Delta D_B$ | $\Delta D_G$ | $\Delta D_R$ |
|---|---|---|---|---|---|---|---|---|---|
| 1 | 1.91 | 2.21 | 2.15 | 0.00 | 0.06 | 0.11 | 0.04 | 0.02 | 0.02 |
| 2 | 1.82 | 2.18 | 2.41 | −0.02 | 0.04 | 0.12 | 0.10 | −0.01 | 0.04 |
| 3 | 1.95 | 2.09 | 2.33 | 0.05 | 0.05 | 0.07 | −0.03 | 0.04 | −0.04 |
| 4 | 1.80 | 2.15 | 2.20 | −0.03 | 0.01 | 0.05 | −0.04 | 0.06 | −0.02 |
| 5 | 1.86 | 2.10 | 2.31 | 0.06 | 0.06 | 0.09 | 0.00 | −0.02 | 0.08 |
| 6 | 1.82 | 2.07 | 2.25 | 0.04 | 0.02 | 0.09 | 0.04 | 0.02 | 0.10 |

$\Delta D_B = D_B(25° C.) - D_B(15° C.)$ or $D_B(35° C.) - D_B(25° C.)$
$\Delta D_G$ and $\Delta D_R$ were determined in the same manner.

EXAMPLE 3

The latex timing layer coated surface of each of Cover Sheets Nos. 1 to 6 prepared in Example 1 and an adhesive coated surface of a heat seal film (a hot melt type adhesive was applied to a support) prepared in the following manner (V) below were placed in a face to face relation and put between two metal blocks heated at 120° C. at a pressure of 1 kg/cm² for 1 second to carry out heat sealing. The film units thus-prepared were maintained in an aging tester of 50° C., 80% relative humidity for 1 day and subjected to adhesion strength measurements using a stretching tester.

(V) Production of Heat Seal Film

On a polyethylene terephthalate film having a thickness of 100μ, a heat melted polymer mixture having the following composition was laminated in an amount 13.5 g per square meter to prepare a hot melt type adhesive layer.

| | |
|---|---|
| Ethylene/Vinyl Acetate Copolymer (ratio by weight: 72:28) (EVA #220 produced by Mitsui Polychemical Co.) | 40 g |
| Partially Hydrogenated Rosin Ester (Estergum H prepared by Arakawa Ringyo Co.) | 40 g |
| Paraffin Wax (melting point: 145° F.) | 20 g |

TABLE D

| Cover Sheet No. | Friction Strength at 0° C. after Aging Test (g/cm) | Position Where Peeling Occurred (°C.) |
|---|---|---|
| 1 | 624 | In hot melt type adhesive |
| 2 | 585 | " |
| 3 | 725 | " |
| 4 | 618 | " |
| 5 (comparison) | 280 | Between latex timing layer and cellulose acetate timing layer |
| 6 (comparison) | 45 | Between latex timing layer and cellulose acetate timing layer |

It can be seen from the results shown in the Table above that in using Cover Sheet No. 6 for comparison, the friction strength at 0° C. after aging test is remarkably low and in using Cover Sheet No. 5 for comparison, the friction strength is somewhat improved but still insufficient for practical use. The portion where peeling occurred is between the cellulose acetate timing layer and the latex timing layer. On the other hand, when Cover Sheets No. 1 to 4, having the latex timing layer of the present invention are used, the strength sufficient for practical use at 0° C. after aging test is observed. This means that where a hydroxymethyl group is introduced as a cross-linking group for a latex, the strength of the layer per se formed from the latex and adhesion to the adjacent layers are superior to where a glycidyl group is introduced as a cross-linking group.

While the invention has been described in detail and with reference to specific embodiments thereof, it will be apparent to one skilled in the art that various changes and modifications can be made therein without departing from the spirit and scope thereof.

What is claimed is:

1. In a photographic element for the color diffusion transfer process including a neutralizing system for reducing the pH of an aqueous alkaline developing solution which comprises a support having coated thereon a neutralizing layer and a timing layer, wherein the timing layer is positioned on or under the neutralizing layer in direct or indirect contact therewith such that the aqueous alkaline developing solution reaches the neutralizing layer through the timing layer, the improvement which comprises the timing layer comprising a polymer latex which is produced by emulsion polymerization of each of at least one monomer selected from the group consisting monomers of Group (A), at least one monomer selected from the group consisting of monomers of Group (B) and at least one monomer selected from the group consisting of monomers of Group (C) wherein:

Group (A) monomers are represented by the following formula (I):

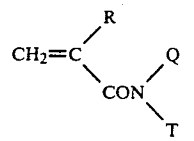

(I)

wherein R represents a hydrogen atom or a methyl group; T represents a hydrogen atom or an aliphatic group; Q represents a $-CH_2OCOR_0$ group, a $-CH_2NR_{1a}R_{1b}$ group, a $-CH_2OR_2$ group,

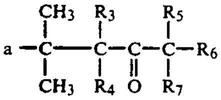

group or a

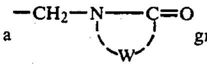

group;

$R_0$ represent an aliphatic group or an aryl group; $R_{1a}$ and $R_{1b}$, which may be the same or different, each represents an aliphatic group or $R_{1a}$ and $R_{1b}$ combine to form a ring; $R_2$ represents a hydrogen atom or an aliphatic group; $R_3$, $R_4$, $R_5$, $R_6$ an $R_7$, which may be the same or different, each represents a hydrogen atom or a $-CH_2OR_2$ group provided that all of the $R_3$ to $R_7$ do not represent hydrogen atoms at the same time; and W represents an atomic group necessary to form a ring together with the —N—CO— linkage;

Group (B) monomers are polymerizable ethylenically unsaturated monomers having at least one free carboxylic acid group or a free phosphoric acid group or a salt thereof; and Group (C) monomers are monomers other than those monomers described in Group (A) and Group (B) above which are copolymerizable with the monomers described in Group (A) and Group (B) above wherein the monomer of Group (C) is a monomer represented by the formula (III):

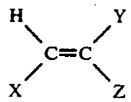

(III)

wherein X represents a hydrogen atom, a methyl group or a $-COOR_9$ group; Y represents a hydrogen atom or a methyl group or a $-(CH_2)_n-COOR_{10}$ group; Z represents an aryl group, a $-COOR_{11}$ group, a cyano group, a halogen atom or a $-O-CO-R_{11}$ group and $R_9$, $R_{10}$ and $R_{11}$, may be the same or different and represent an aliphatic group or an aryl group; and n represents an integer of 0 to 3.

2. The photographic element of claim 1, wherein the monomer (A) is N-hydroxymethylacrylamide.

3. The photographic element of claim 1, wherein the monomer (A) is represented by the following formula (Ia):

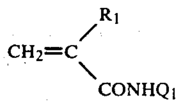

(Ia)

wherein $Q_1$ represents a $-CH_2OR_{2a}$ group or

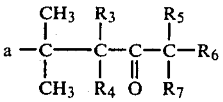

wherein $R_{2a}$ is an alkyl group having 1 to 6 carbon atoms and $R_3$ to $R_7$ have the same definition as in the formula (I) when $R_1$ represents a hydrogen atom; or $Q_1$ represents a $-CH_2OR_2$ group of

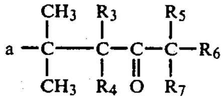

group wherein $R_2$ to $R_7$ have the same definition as in the general formula (I) when $R_1$ represents a methyl group.

4. The photographic element of claim 1, wherein the monomer of Group (B) is a monomer represented by the formula (II):

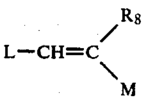

(II)

wherein $R_8$ represents a hydrogen atom or a methyl group; L and M, which may be the same or different, each represents a hydrogen atom, a carboxy group, a carboxyalkylene gorup, an alkoxycarbonyl group, or a $-COO-R'-OPO_3H_2$ group wherein R' represents a straight chain or branched chain alkylene group, or the carboxy group, the carboxyalkylene or the $-COO-R'-OPO_3H_2$ group represented by L and M forms a salt, at least one of L and M being said carboxy group, said carboxyalkylene group, said 13 COO—R'—$OPO_3H_2$ group or said salt.

5. The photographic element of claim 1, wherein the monomer of Group (B) is acrylic acid, methacrylic acid or itaconic acid.

6. The photographic element of claim 1, wherein the monomer of Group (A) is N-hydroxymethylmethacrylamide, an N-alkoxymethylacrylamide or an N-alkoxymethylmethacrylamide and the monomer of Group (B) is acrylic acid, methacrylic acid or itaconic acid.

7. The photographic element of claims 4, or 5, wherein the monomer represented by the general formula (III) is a mixture of a first monomer which forms a homopolymer having a glass transition temperature of about 50° C. or more and a second monomer which forms a homopolymer having a glass transition temperature of about 40° C. or less.

8. The photographic element of claim 7, wherein said first monomer is styrene, acrylonitrile or methyl methacrylate and said second monomer is a substituted or unsubstituted alkyl acrylate.

9. The photographic element of claim 4, wherein at least one of the monomers of general formula (III) is butyl methacrylate.

10. The photographic element of claim 8, wherein said first monomer is styrene or methyl methacrylate and said second monomer is butyl acrylate.

11. The photographic element of claims 2, 3 or 4, wherein the monomer of Group (A) is present in an amount of about 0.5 to about 40 weight%, the monomer of Group (B) is present in an amount of about 1 to 12 weight%, and the monomer of Group (C) is present in an amount of about 48 to 99 weight%.

12. The photographic element of claim 1, wherein said photographic element is a cover sheet.

13. The photographic element of claim 1, wherein the photographic element is a laminate integral type film unit which comprises:

a photosensitive sheet comprising an image-receiving element containing silver halide emulsion layer(s) and a photosensitive element coated in turn on a support, a transparent cover sheet which covers the outermost layer positioned on the support including a neutralizing layer and said timing layer, and a processing element capable of being spread between said photosensitive element and said cover sheet.

14. The photographic element of claim 13, wherein said elements are strippable elements.

15. The photographic element of claim 13, wherein said photosensitive element contains at least one silver halide photographic emulsion layer and a dye image-forming material associated therewith.

16. The photographic element of claim 15, wherein said dye image-forming material is present in a layer adjacent said photographic emulsion layer.

17. The photographic element of claim 15, wherein said dye image-forming material is a compound capable of being oxidized by an oxidation product of a developing agent and releasing a diffusible dye.

18. The photographic element of claim 15, wherein said photographic emulsion is a direct reversal photographic emulsion.

19. The photographic element of claim 18, wherein said direct reversal photographic emulsion is an internal latent image type direct reversal photographic emulsion.

20. The photographic element of claim 19, wherein the internal latent image type emulsion is an internal latent image type emulsion comprising a core and a shell.

21. The photographic element of claim 17, wherein said dye image-forming material is combined with a direct reversal photographic emulsion layer.

22. The photographic element of claim 1, wherein said polymer latex of said timing layer is a latex free of water-soluble materials other than surface active agents which are used as emulsifying agents or coating aids, either during preparation of said latex or said timing layer.

23. The photographic element of claim 1, wherein said neutralizing system has a $T_{15}/T_{25}$ value of about 2.5 to about 6.0, wherein $T_{15}$ is the time require for reducing the pH of the alkaline processing solution to 10 at 15° C. and $T_{25}$ is the period of time required for reducing the pH of the alkaline processing solution to 10 at 25° C.

24. The photographic element of claim 23, wherein the $T_{15}/T_{25}$ value is about 3.0 to 5.0.

* * * * *